(12) United States Patent
Seo (10) Patent No.: US 8,817,274 B2
(45) Date of Patent: Aug. 26, 2014

(54) THICKNESS VARIATION MEASURING DEVICE, SYSTEM USING SAME, SURFACE MICROSCOPE USING SAME, THICKNESS VARIATION MEASURING METHOD, AND SURFACE IMAGE ACQUIRING METHOD USING SAME

(76) Inventor: Bongmin Seo, Gangwon-do (KR)

( * ) Notice: Subject to any disclaimer, the term of this patent is extended or adjusted under 35 U.S.C. 154(b) by 300 days.

(21) Appl. No.: 13/380,546

(22) PCT Filed: Jun. 22, 2010

(86) PCT No.: PCT/KR2010/004044
§ 371 (c)(1),
(2), (4) Date: Dec. 23, 2011

(87) PCT Pub. No.: WO2010/151030
PCT Pub. Date: Dec. 29, 2010

(65) Prior Publication Data
US 2012/0099116 A1 Apr. 26, 2012

(30) Foreign Application Priority Data

Jun. 23, 2009 (KR) .................. 10-2009-0055711
Jun. 22, 2010 (KR) .................. 10-2010-0059064

(51) Int. Cl.
*G01B 11/28* (2006.01)
(52) U.S. Cl.
USPC ........................................... 356/630
(58) Field of Classification Search
None
See application file for complete search history.

(56) References Cited

U.S. PATENT DOCUMENTS

| 3,661,462 | A | * | 5/1972 | Natens ............................. 356/51 |
| 3,994,586 | A | * | 11/1976 | Sharkins et al. ................. 356/73 |
| 4,748,329 | A | * | 5/1988 | Cielo et al. ................ 250/559.28 |
| 5,715,061 | A | * | 2/1998 | Fujiwara ....................... 356/623 |
| 6,489,624 | B1 | * | 12/2002 | Ushio et al. ............. 250/559.27 |
| 2007/0229852 | A1 | * | 10/2007 | Wack et al. .................... 356/625 |
| 2009/0059236 | A1 | * | 3/2009 | Meeks et al. .................. 356/445 |

FOREIGN PATENT DOCUMENTS

| JP | 05-203564 A | 8/1993 |
| JP | 06-180254 A | 6/1994 |
| JP | 07-260436 A | 10/1995 |
| JP | 2006-214935 | 8/2006 |
| JP | 2007-155393 A | 6/2007 |
| KR | 10-0456352 B1 | 11/2004 |

* cited by examiner

*Primary Examiner* — Gordon J Stock, Jr.
(74) *Attorney, Agent, or Firm* — Stuart H. Mayer; Mayer & Williams PC (57) ABSTRACT

Provided are an apparatus for measuring a thickness change, a system using the apparatus, a morphology microscope using the apparatus, a method of measuring a thickness change, and a method of acquiring a morphology image by using the measuring method, by which a minute thickness change may be precisely and accurately measured or a morphology image may be acquired by using an inexpensive and simple configuration. The apparatus includes a light source for irradiating beam onto a target object; a curved reflector for reflecting the beam reflected on the target object and incident onto the curved reflector; and a sensing unit for sensing the beam reflected on the curved reflector.

25 Claims, 6 Drawing Sheets

THICKNESS VARIATION MEASURING DEVICE, SYSTEM USING SAME, SURFACE MICROSCOPE USING SAME, THICKNESS VARIATION MEASURING METHOD, AND SURFACE IMAGE ACQUIRING METHOD USING SAME

TECHNICAL FIELD

The present invention relates to an apparatus for measuring a thickness change, a system using the apparatus, a morphology microscope using the apparatus, a method of measuring a thickness change, and a method of acquiring a morphology image by using the measuring method, and more particularly, to an apparatus for measuring a thickness change, a system using the apparatus, a morphology microscope using the apparatus, a method of measuring a thickness change, and a method of acquiring a morphology image by using the measuring method, by which a minute thickness change may be precisely and accurately measured or a morphology image may be acquired by using an inexpensive and simple configuration.

BACKGROUND ART

In general, an apparatus for measuring a thickness change measures the thickness or a thickness change of a thin film.

The thickness of a thin film is conventionally measured by using two representative methods described below.

The first is a method of monitoring a thickness change in real time by measuring the amount of deposition by using a crystal oscillator sensor. However, since the crystal oscillator sensor has to be replaced frequently, accurate calibration is required, and the crystal oscillator sensor is saturated and shows a non-linear result if the deposition exceeds a certain amount, the above method may not easily monitor the thickness change in real time.

The second is a method of measuring the thickness of a thin film after the thin film is completely deposited. For this, various schemes such as ellipsometry, a white light interferometer, alpha-step, and a laser triangulation system may be used according to a material of the thin film. However, if the thin film has a thickness of about 10 nm, the thickness may not be easily accurately measured. Even when a thickness of 1 μm is measured by using the above method, there may be various problems in, for example, preparing a sample or other factors.

Also, since an optical system such as confocal optics requires a high level of precision in order to increase the accuracy of measuring the thickness of an ultra thin film, precise alignment is demanded and thus the price of overall parts or components is inevitably increased.

DETAILED DESCRIPTION OF THE INVENTION

Technical Problem

The present invention provides an apparatus for measuring a thickness change, a system using the apparatus, a morphology microscope using the apparatus, a method of measuring a thickness change, and a method of acquiring a morphology image by using the measuring method, by which a minute thickness change may be precisely and accurately measured or a morphology image may be acquired by using an inexpensive and simple configuration.

Technical Solution

According to an aspect of the present invention, there is provided an apparatus for measuring a thickness change, the apparatus including a light source for irradiating beam onto a target object; a curved reflector for reflecting the beam reflected on the target object and incident onto the curved reflector; and a sensing unit for sensing the beam reflected on the curved reflector.

The light source may irradiate the beam onto the target object at an angle of 45°.

The apparatus may further include a lens unit for passing the beam emitted from the light source before reaching the target object, and the lens unit may gradually reduce a beam width of the beam emitted from the light source after being passed through the lens unit and until being incident onto the curved reflector.

The apparatus may further include a lens unit for passing the beam emitted from the light source before reaching the target object, and the lens unit may change a beam width of the beam emitted from the light source after being passed through the lens unit in such a way that the beam has a uniform beam width after being reflected on the curved reflector and until being incident onto the sensing unit.

The apparatus may further include a lens unit for passing the beam emitted from the light source before reaching the target object, and the lens unit may change a beam width of the beam emitted from the light source after being passed through the lens unit in such a way that the beam reflected on the target object converges on a center of a radius curvature at an incident position of the beam on the curved reflector.

The light source may be a laser light source.

The light source may include a light-emitting device; and a pin hole for passing a portion of light emitted from the light-emitting device.

The curved reflector may be at least a portion of a spherical reflective surface.

The apparatus may measure a thickness change of the target object according to a difference between a first position sensed by the sensing unit when beam reflected on the target object before a thickness of the target object is changed is reflected on the curved reflector and is incident onto the sensing unit, and a second position sensed by the sensing unit when beam reflected on the target object after the thickness of the target object is changed is reflected on the curved reflector and is incident onto the sensing unit.

The apparatus may measure a thickness change of the target object according to a difference between a first position sensed by the sensing unit when beam reflected on one position of the target object is reflected on the curved reflector and is incident onto the sensing unit, and a second position sensed by the sensing unit when beam reflected on another position of the target object is reflected on the curved reflector and is incident onto the sensing unit.

The apparatus may further include an amplifier tube for passing the beam reflected on the curved reflector before being incident onto the sensing unit, and having at least two facing reflective surfaces.

The at least two facing reflective surfaces of the amplifier tube may be parallel to each other.

The sensing unit may be disposed at an end of any one of the at least two facing reflective surfaces of the amplifier tube.

The sensing unit may include a first sensing unit disposed at an end of any one of the at least two facing reflective surfaces of the amplifier tube; and a second sensing unit disposed at an end of the other of the at least two facing reflective surfaces of the amplifier tube.

The apparatus may further include at least one of an incident angle adjusting unit for adjusting an incident angle of the beam reflected on the curved reflector, into the amplifier tube;

and an exit angle adjusting unit for adjusting an incident angle of the beam passed through the amplifier tube, onto the sensing unit.

The apparatus may further include a light source actuator for adjusting an incident angle of the beam irradiated from the light source onto the target object.

The apparatus may further include a stage for mounting the target object; and a stage actuator for changing a position of the stage with respect to the curved reflector.

According to another aspect of the present invention, there is provided a system using the above apparatus.

According to another aspect of the present invention, there is provided a morphology microscope including the above apparatus; and a scanner for changing a position of a target object on a plane.

According to another aspect of the present invention, there is provided a method of measuring a thickness change, the method including (a) irradiating beam onto a target object before a thickness of the target object is changed; (b) defining a first position of the beam reflected on the target object, reflected on a curved reflector, and incident onto a sensing unit; (c) irradiating beam onto the target object after the thickness of the target object is changed; (d) defining a second position of the beam reflected on the target object, reflected on the curved reflector, and incident onto the sensing unit; and (e) determining the thickness change of the target object according to a difference between the first and second positions.

According to another aspect of the present invention, there is provided a method of measuring a thickness change, the method including (a) irradiating beam onto one position of a target object; (b) defining a first position of the beam reflected on the target object, reflected on a curved reflector, and incident onto a sensing unit; (c) irradiating beam onto another position of the target object; (d) defining a second position of the beam reflected on the target object, reflected on the curved reflector, and incident onto the sensing unit; and (e) determining the thickness change of the target object according to a difference between the first and second positions.

The steps (a) and (c) may include irradiating the beam onto the target object at an angle of 45°.

The steps (a) and (c) may include irradiating the beam to be passed through a lens unit before reaching the target object, and the lens unit may gradually reduce a beam width of the beam after being passed through the lens unit and until being incident onto the curved reflector.

The steps (a) and (c) may include irradiating the beam to be passed through a lens unit before reaching the target object, and the lens unit may change a beam width of the beam after being passed through the lens unit in such a way that the beam has a uniform beam width after being reflected on the curved reflector and until being incident onto the sensing unit.

The steps (a) and (c) may include irradiating the beam to be passed through a lens unit before reaching the target object, and the lens unit may change a beam width of the beam after being passed through the lens unit in such a way that the beam reflected on the target object converges on a center of a radius curvature at an incident position of the beam on the curved reflector.

The beam may be a laser beam.

The curved reflector may be at least a portion of a spherical reflective surface.

The steps (b) and (d) may include passing the beam reflected on the curved reflector through an amplifier tube having at least two facing reflective surfaces before being incident onto the sensing unit.

The at least two facing reflective surfaces of the amplifier tube may be parallel to each other.

According to another aspect of the present invention, there is provided a method of acquiring a morphology image, the method including (a) irradiating beam onto one position of a target object; (b) defining a position of the beam reflected on the target object, reflected on a curved reflector, and incident onto a sensing unit; (c) changing a position of the target object on a plane so as to change an incident position of the beam onto the target object, and repeating the steps (a) and (b); and (d) defining a morphology image of the target object by using data regarding the positions of the beam incident onto the sensing unit.

Advantageous Effects

In an apparatus for measuring a thickness change, a system using the apparatus, a morphology microscope using the apparatus, a method of measuring a thickness change, and a method of acquiring a morphology image by using the measuring method, according to the present invention, a minute thickness change may be precisely and accurately measured or a morphology image may be acquired by using an inexpensive and simple configuration.

BEST MODE

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of elements may be exaggerated or simplified for convenience of explanation.

Figure 1:
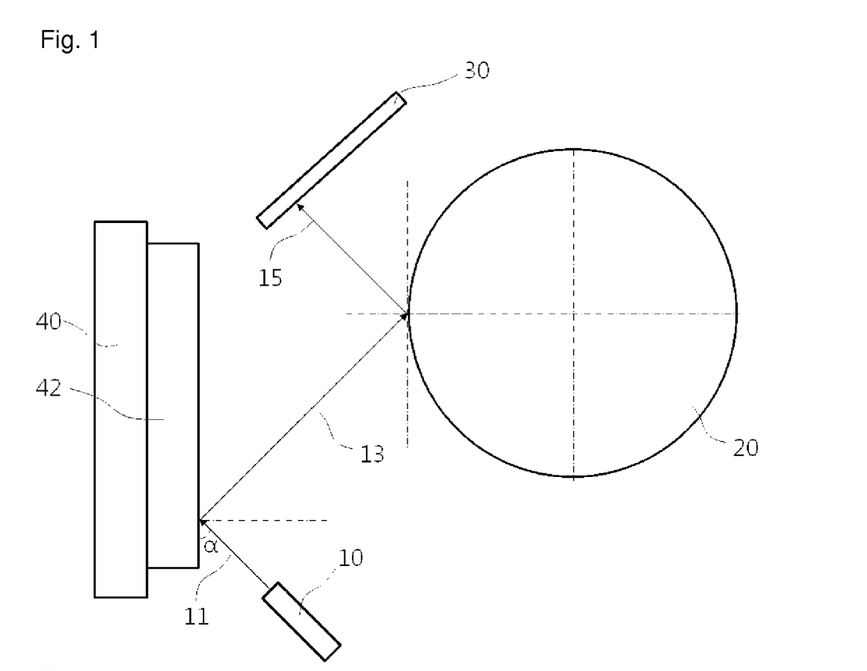
FIGS. 1 and 2 are conceptual views of an apparatus for measuring a thickness change of a target object, according to an embodiment of the present invention.
Figure 2:
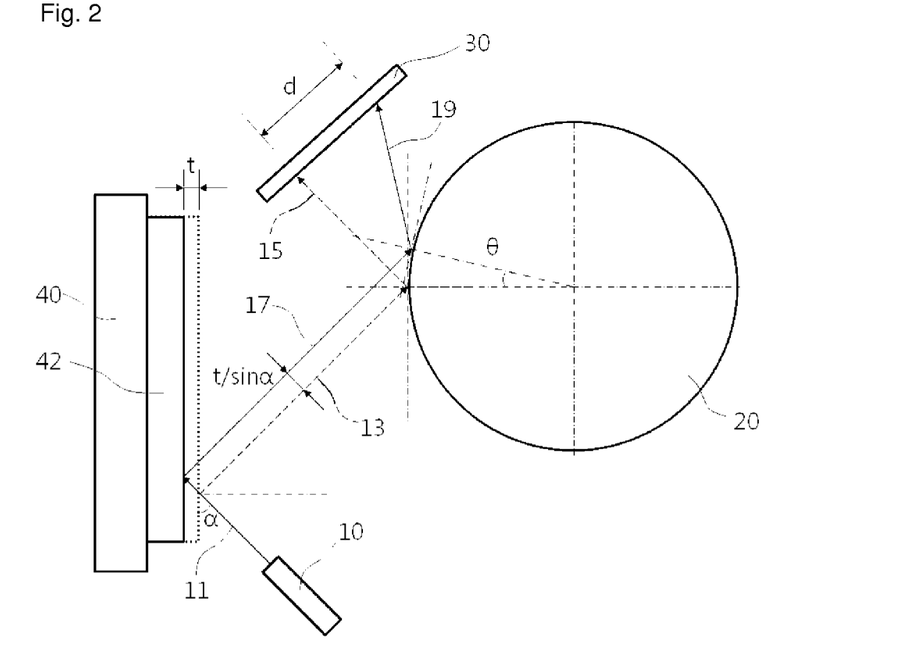

FIGS. 1 and 2 are conceptual views of an apparatus for measuring a thickness change of a target object 42, according to an embodiment of the present invention. Referring to FIGS. 1 and 2, the apparatus according to the current embodiment includes a light source 10, a curved reflector 20, and a sensing unit 30. If necessary, the apparatus may further include a stage 40 for mounting the target object 42.

The light source 10 may irradiate beam 11 onto the target object 42. The light source 10 may be, but is not limited to, a laser. For example, the light source 10 may include a light-emitting device and a pin hole for passing a portion of light emitted from the light-emitting device. That is, any element capable of irradiating the beam 11 having directionality onto the target object 42 may be used as the light source 10. For example, any element may be used as the light source 10 as long as the beam 11 having a width of several mm is irradiated from the element and the width is not increased even when the beam 11 proceeds by 10 m. If the above condition is satisfied, for example, a light-emitting diode (LED), a semiconductor laser, or a white light lamp may be appropriately used. Also, for example, the wavelength or width of the beam 11 may be appropriately varied according to a refractive index, a reflectance, and/or an absorptance on a surface of the target object 42. Since a laser beam has an excellent linearity, the light source 10 may be a laser.

The curved reflector 20 may reflect the beam 13, reflected on the target object 42 and then incident onto the curved reflector 20. The curved reflector 20 may have various shapes. For example, as illustrated in FIG. 1, the curved reflector 20 may be a spherical reflective surface. Hereinafter, for convenience' sake, it is assumed that the curved reflector 20 is a spherical reflective surface. The sensing unit 30 may sense the beam 15 reflected on the curved reflector 20. The sensing unit 30 may include, for example, a charge-coupled device (CCD) or a complementary metal-oxide semiconductor (CMOS).

A method of measuring a thickness change by using the apparatus will now be described.

Initially, as illustrated in FIG. 1, the beam 11 is irradiated by using the light source 10 onto the target object 42 on the stage 40. FIG. 1 illustrates a case when an incident angle is "90°-α". The beam 11 is reflected on the surface of the target object 42. The reflected beam 13 is incident onto the curved reflector 20 and is re-reflected on the curved reflector 20. The reflected beam 15 is ultimately incident onto the sensing unit 30. The sensing unit 30 may define a position where the reflected beam 15 is incident, as a first position.

Then, after the thickness of the target object 42 is changed, as illustrated in FIG. 2, the beam 11 is re-irradiated by using the light source 10 onto the target object 42 on the stage 40. FIG. 2 illustrates a case when the thickness of the target object 42 is reduced by t. The case may correspond to, for example, a case when a thin film is etched. In this case, the beam 11 is incident onto the target object 42 at the same incident angle used before the thickness is changed. The beam 11 is reflected on the surface of the target object 42. The reflected beam 17 is incident onto the curved reflector 20 and is re-reflected on the curved reflector 20. The reflected beam 19 is ultimately incident onto the sensing unit 30. The sensing unit 30 may define a position where the reflected beam 19 is incident, as a second position. For reference, the distance between the reflected beam 13 and the reflected beam 17 is geometrically determined as $t/\sin \alpha$.

A distance d between the defined first and second positions 1:1 corresponds to the thickness change t of the target object 42. Accordingly, the thickness change t of the target object 42 may be accurately measured by using the distance d between the first and second positions.

Although the thickness change t of the target object 42 may be measured by using a conventional measuring apparatus, an inaccurate result may be obtained or a very expensive measuring apparatus has to be used to obtain an accurate result. However, if the apparatus according to the current embodiment is used, accurate measurement may be achieved even by using an inexpensive and simple configuration. In particular, as illustrated in FIGS. 1 and 2, since the curved reflector 20 is used and thus the distance d between the first and second positions defined by the sensing unit 30 is much greater than the thickness change t of the target object 42, even when the sensing unit 30 is neither highly precise nor expensive, the minute thickness change t of the target object 42 may be precisely measured by measuring the great distance d between the first and second positions.

As described above, the distance d between the first and second positions 1:1 corresponds to the thickness change t of the target object 42. The correspondence may be determined in various ways according to a situation. Hereinafter, for convenience' sake, a case when the reflected beam 13 is incident onto an equator of the curved reflector 20 (a spherical reflective surface) before the thickness of the target object 42 is changed will be described with reference to FIGS. 1 and 2.

Since the light source 10 irradiates the beam 11 onto the target object 42 at an incident angle of 90°-α, under the above condition, the reflected beam 13 is incident onto the curved reflector 20 at an incident angle of 90°-α and the reflected beam 15 is reflected on the curved reflector 20 at a reflection angle of 90°-α.

Figure 3:
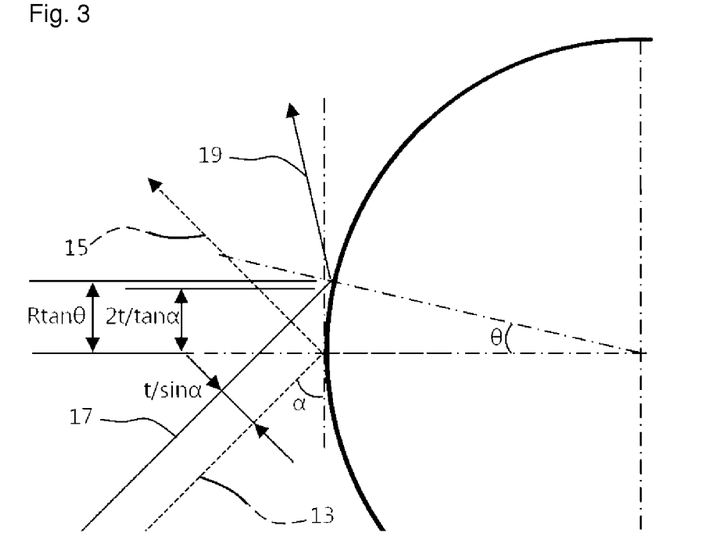
FIGS. 3 and 4 are conceptual views showing the principle of determining a thickness change.
Figure 4:
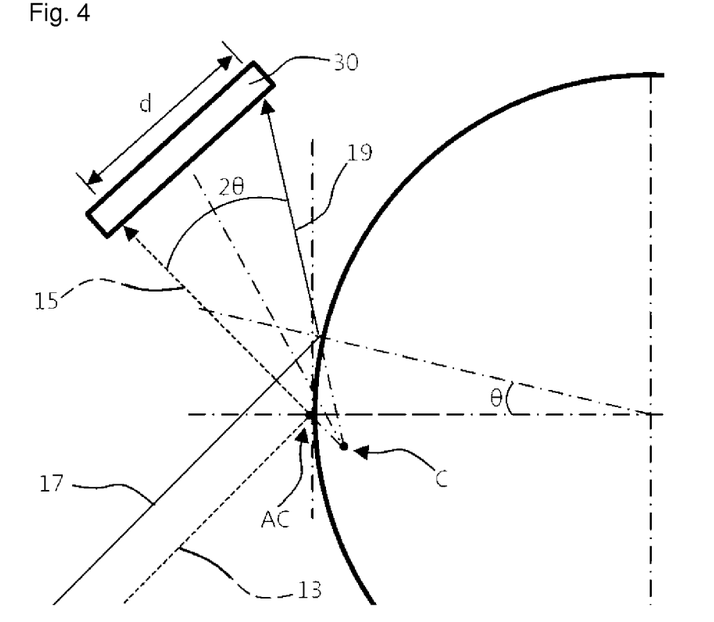

FIGS. 3 and 4 are conceptual views showing the principle of determining the thickness change t. Initially, a radius of the curved reflector 20 (a spherical reflective surface) is defined as R, and an angle at the center of the curved reflector 20 between an incident position of the reflected beam 13 and an incident position of the reflected beam 17 on the curved reflector 20 is defined as θ.

Referring to FIG. 3, a distance from a position where a plane tangent to the curved reflector 20 at the incident position of the reflected beam 13 on the curved reflector 20 meets a straight line for connecting the incident position of the reflected beam 17 on the curved reflector 20 and the center of the curved reflector 20, to the incident position of the reflected beam 13 on the curved reflector 20 is geometrically determined as $R \tan \theta$. Also, a distance from a position where the plane tangent to the curved reflector 20 at the incident position of the reflected beam 13 on the curved reflector 20 meets the reflected beam 17, to the incident position of the reflected beam 13 on the curved reflector 20 is geometrically determined as $2t/\tan \alpha$. As will be described below, since θ has a very small value, the position where the plane tangent to the curved reflector 20 at the incident position of the reflected beam 13 on the curved reflector 20 meets the straight line for connecting the incident position of the reflected beam 17 on the curved reflector 20 and the center of the curved reflector 20 may be regarded as being the same as the position where the plane tangent to the curved reflector 20 at the incident position of the reflected beam 13 on the curved reflector 20 meets the reflected beam 17. Accordingly, $R \tan \theta = 2t/\tan \alpha$ may be satisfied and the thickness change t of the target object 42 may be ultimately represented as $R(\tan \theta \tan \alpha)/2$.

Referring to FIG. 4, an angle between the reflected beam 15 and the reflected beam 19 is geometrically determined as 2θ. If a distance from an incident position AC of the reflected beam 13 on the curved reflector 20 to an incident position of the reflected beam 15 on the sensing unit 30 (the distance may be approximated as the shortest distance from the incident position AC of the reflected beam 13 on the curved reflector 20 to the sensing unit 30) is L, as will be described below, since a center C where the reflected beam 15 and the reflected beam 19 converge is very close to the incident position AC of the reflected beam 13 on the curved reflector 20 and thus may be approximated as being the same as the incident position AC of the reflected beam 13 on the curved reflector 20, the distance d between the first and second positions on the sensing unit 30 may be regarded as L2θ. Although L2θ is a length of an arc of a sector having a radius of L and a central angle of 2θ and may be regarded as being different from the distance d between the first and second positions on the sensing unit 30, as will be described below, since 2θ has a very small value, approximation may be enabled.

Since θ ultimately satisfies θ=d/2L, the thickness change t of the target object 42 may be measured as R(tan θ tan α)/2.

In the above measuring method, θ is regarded as a very small value and the center C where the reflected beam 15 and the reflected beam 19 converge is regarded as being the same as the incident position AC of the reflected beam 13 on the curved reflector 20. Detailed descriptions thereof will now be provided with specific numbers.

Initially, it is assumed that the thickness change t of the target object 42 is 10 nm, that the incident angle (90°-α) of the beam 11 is 45°, and that the curved reflector 20 is a spherical reflective surface having a radius R of 10 mm. If the above specific numbers are input into R tan θ=2t/tan α, then tan θ=2×10$^{-6}$ and thus θ is calculated as 2×10$^{-6}$ (unit: radian). That is, θ has a very small value. Since θ has a very small value, referring to FIG. 4, it is clearly shown that the center C where the reflected beam 15 and the reflected beam 19 converge is very close to the incident position AC of the reflected beam 13 on the curved reflector 20, and thus may be regarded as being the same as the incident position AC of the reflected beam 13 on the curved reflector 20. Accordingly, the above description may be logically supported.

Meanwhile, under the above condition, the distance d between the first and second positions defined by the sensing unit 30 may be measured as follows. As described above, since the distance d between the first and second positions defined by the sensing unit 30 may be represented as L2θ, if L is 1 m, d=1×2×2×10$^{-6}$=4 μm. That is, a thickness change of 10 nm in the target object 42 is represented as 4 μm in the sensing unit 30. This means that the apparatus according to the current embodiment may sense a thickness change of 10 nm even when a sensing unit capable of sensing a change of about 4 μm that is almost 400 times greater than 10 nm is used instead of a sensing unit capable of sensing a change of about 10 nm. This ultimately means that the apparatus according to the current embodiment may very precisely measure a minute thickness change even by using an inexpensive and simple configuration of the sensing unit 30.

Although approximation is enabled as described above, instead of approximation, an accurate value may be geometrically calculated. It is geometrically clear that the thickness change t of the target object 42 corresponds one-to-one to the distance d between the first and second positions on the sensing unit 30. Accordingly, if positions of the light source 10, the target object 42, the curved reflector 20, and the sensing unit 30 are determined, the distance d between the first and second positions on the sensing unit 30 corresponding to the thickness change t of the target object 42 may be accurately and uniquely determined by performing, for example, a computer simulation.

Mode of the Invention

Although a method of measuring a thickness change under various conditions is described above, the present invention is not limited thereto. That is, the thickness change t of the target object 42 may be determined even without the above-described conditions for geometrically determining θ=d/2L and t=R(tan θ tan α)/2. In more detail, the apparatus according to the current embodiment mainly uses a principle that a minute thickness change t, i.e., a change in straight-line distance is converted into an angle change θ while light is reflected on the curved reflector 20, that the minute thickness change t is ultimately converted into a horizontal distance d while the light proceeds from the curved reflector 20 to the sensing unit 30, and that the size of the horizontal distance d corresponds to a value obtained by greatly amplifying the minute thickness change t.

Even when the reflected beam 13 is not incident onto an equator of the curved reflector 20 that is a spherical reflective surface, and even when the curved reflector 20 is an arbitrary curved surface instead of a spherical reflective surface, it is geometrically clear that the thickness change t of the target object 42 corresponds one-to-one to the distance d between the first and second positions on the sensing unit 30. Accordingly, after the apparatus illustrated in FIG. 1 is set, if data regarding the distance d between the first and second positions on the sensing unit 30 is acquired by using various samples of which thicknesses are already known and then is formed into a database, an arbitrary thickness change t of the target object 42 may be accurately measured.

Meanwhile, as illustrated in FIGS. 1 and 2, if the curved reflector 20 is a spherical reflective surface, if the light source 10 always irradiates the beam 11 at an angle of 45° onto the target object 42, and if the reflected beam 13 is incident onto an equator of the curved reflector 20, then the thickness change t of the target object 42 may be precisely measured without changing the position of the sensing unit 30.

Figure 5:
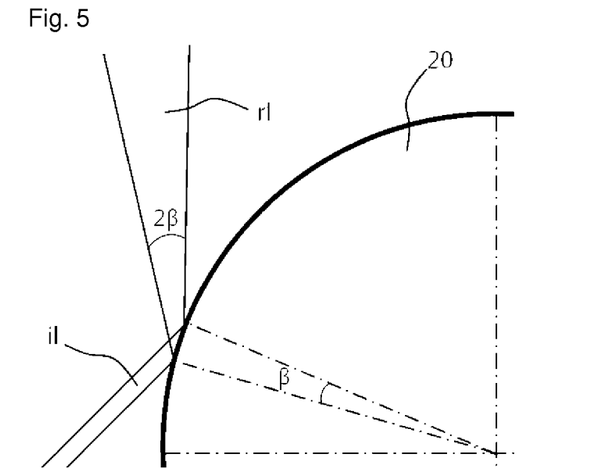
FIG. 5 is a conceptual view for describing the necessity of collimating beam to use the apparatus illustrated in FIGS. 1 and 2.

FIG. 5 is a conceptual view for describing the necessity of collimating light to use the apparatus illustrated in FIGS. 1 and 2. As illustrated in FIG. 5, if incident beam it incident onto the curved reflector 20 has a uniform beam width, the beam width of reflected beam rl reflected on the curved reflector 20 is increased away from the curved reflector 20. If the beam width is increased, the sensing unit 30 may not accurately define the first and second positions.

Figure 6:
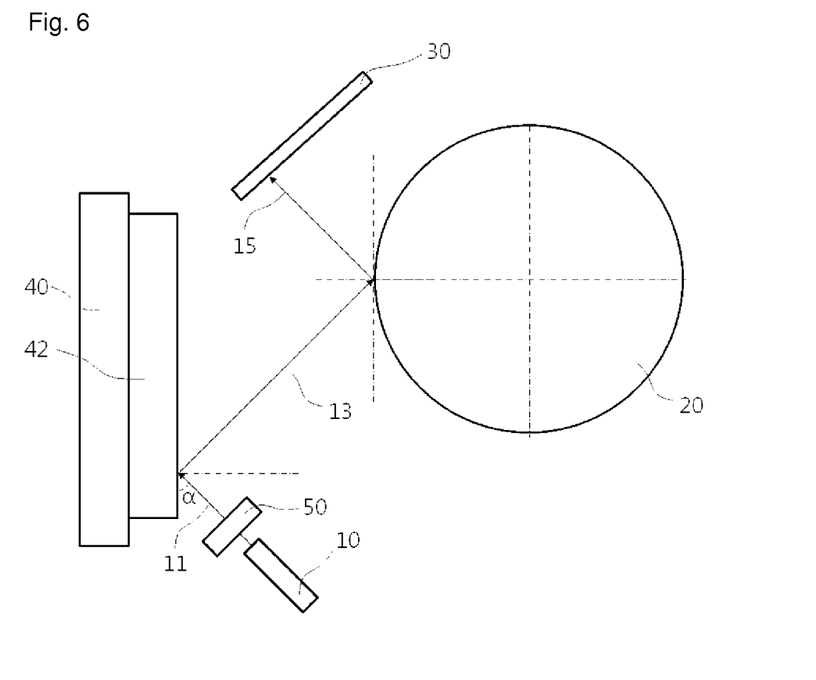
FIG. 6 is a conceptual view of an apparatus for measuring a thickness change, according to another embodiment of the present invention.

Therefore, as illustrated in FIG. 6 that is a conceptual view of an apparatus for measuring a thickness change, according to another embodiment of the present invention, the apparatus may further include a lens unit 50 for passing the beam emitted from the light source 10 before reaching the target object 42. The lens unit 50 may gradually reduce the beam width of the beam emitted from the light source 10 after being passed through the lens unit 50 and until being incident onto the curved reflector 20. That is, the lens unit 50 may concavely transform a wavefront of the beam emitted from the light source 10 and incident onto the lens unit 50. Unlike the incident beam il of which a uniform beam width is gradually increased after being reflected in FIG. 5, the beam having a gradually reduced beam width before being incident onto the curved reflector 20 is collimated to uniformly maintain or slightly reduce its beam width without being gradually increased after being reflected on the curved reflector 20 until being incident onto the sensing unit 30. As such, the sensing unit 30 may accurately define the first and second positions. In this regard, the lens unit 50 may be referred to as a collimation lens unit.

The lens unit 50 may gradually reduce the beam width of the beam emitted from the light source 10 after being passed through the lens unit 50 and until being incident onto the curved reflector 20 in such a way that the beam has a uniform beam width after being reflected on the curved reflector 20 until being incident onto the sensing unit 30. That is, the lens unit 50 may transform the beam passed through the lens unit 50 to have a wavefront that converges on a central portion of the curved reflector 20, by matching the wavefront of the beam incident onto the lens unit 50 in a concave form to a curvature radius of the curved reflector 20, in such a way that the beam reflected on the curved reflector 20 has a uniform beam width without diverging or converging (except for a case when the beam reaches a diffraction limit angle).

As illustrated in FIG. 5, when the incident beam il having a uniform beam width is incident onto the curved reflector 20 (a spherical reflective surface), if an angle of an image of the incident beam il on the curved reflector 20 from the center of the curved reflector 20 is $\beta$, the reflected beam rl spreads at an angle of $2\beta$. Accordingly, on the contrary, if the lens unit 50 adjusts the beam emitted from the light source 10 in such a way that the incident beam il is incident onto the curved reflector 20 at a convergence angle of $2\beta$, the reflected beam rl reflected on the curved reflector 20 has a uniform beam width on an optical path.

If a beam width when the beam width is uniform is w and the curved reflector 20 is a spherical reflective surface having a radius of R in FIG. 5, since $\beta$ is very small and the beam width also has a small value, it may be approximated as $w=R\beta$. Accordingly, if R=10 mm, then $\beta=w/R=w\times100$ (unit of $\beta$: radian; unit of w: meter). If the uniform beam width of the beam 15 or 19 (please refer to FIG. 2) reflected on the curved reflector 20 is 1 mm, then $\beta=0.1$ radian. If the uniform beam width of the beam 15 or 19 reflected on the curved reflector 20 is 0.1 mm, then $\beta=0.01$ radian. Accordingly, if the lens unit 50 adjusts the beam 11 emitted from the light source 10 to have an angle of 0.2 radian in the former case or to have an angle of 0.02 radian in the latter case, the beam 15 or 19 reflected on the curved reflector 20 may have an almost uniform beam width.

The lens unit 50 is only required to change the beam width of the beam emitted from the light source 10 after being passed through the lens unit 50 in such a way that the beam has a uniform light width after being reflected on the curved reflector 20 and until being incident onto the sensing unit 30. For example, although beam having a uniform width is irradiated onto the target object 42, if the surface of the target object 42 is not uniform, the beam 13 or 17 (please refer to FIG. 2) reflected on the target object 42 may have a gradually reduced beam width along an optical path. Here, if the beam width is excessively reduced, the beam width may not become uniform and may be continuously reduced even after the beam is reflected on the curved reflector 20. In this case, the lens unit 50 may increase the light width of the beam emitted from the light source 10 when the beam is pass through the lens unit 50 in such a way that the beam reflected on the curved reflector 20 has a uniform beam width until being incident onto the sensing unit 30.

Ultimately, the lens unit 50 is only required to change the beam width of the beam emitted from the light source 10 in such a way that the beam 13 or 17 reflected on the target object 42 converges on the center of a radius curvature at an incident position of the beam 13 or 17 on the curved reflector 20.

The lens unit 50 may uniformly change the light width of the beam emitted from the light source 10 or may variously change the beam width according to a situation (an active lens unit). For example, a degree of changing the beam width needs to be adjusted according to a radius curvature of the curved reflector 20, the target object 42, and the light source 10.

Figure 7:
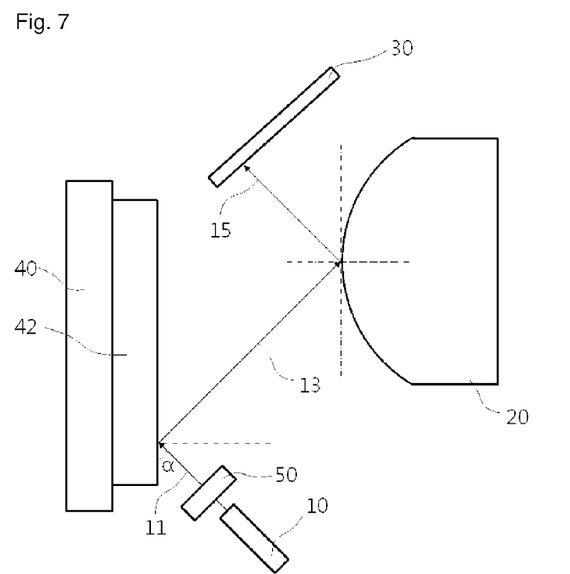
FIG. 7 is a conceptual view of an apparatus for measuring a thickness change, according to another embodiment of the present invention.

Meanwhile, although the curved reflector 20 is a spherical reflective surface in FIGS. 1 through 6, as illustrated in FIG. 7 that is a conceptual view of an apparatus for measuring a thickness change, according to another embodiment of the present invention, the curved reflector 20 is only required to be at least a portion of a spherical reflective surface. As described above, the curved reflector 20 may be an arbitrary curved surface instead of a spherical reflective surface. For example, a cylindrical surface is also available. That is, any element capable of changing the thickness change t (a length change) of the target object 42 may be used as the curved reflector 20.

Figure 8:
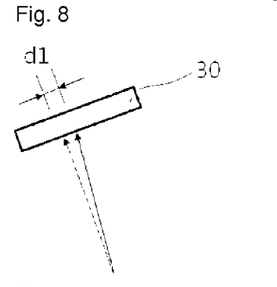
FIGS. 8 through 10 are conceptual views of an apparatus for measuring a thickness change, according to another embodiment of the present invention.
Figure 9:
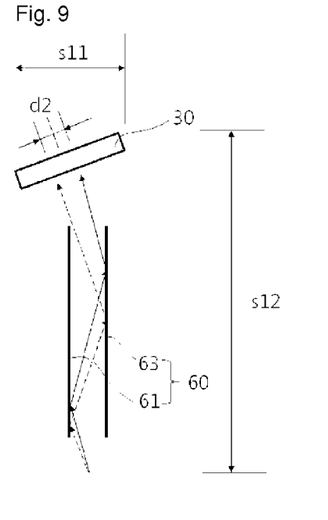
Figure 10:
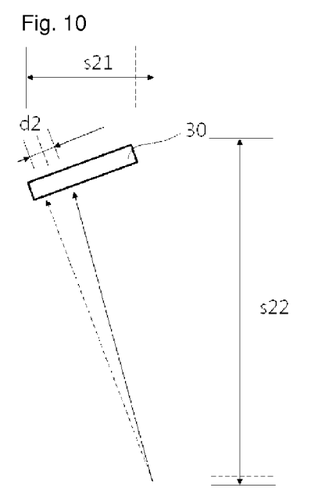

FIGS. 8 through 10 are conceptual views of an apparatus for measuring a thickness change, according to another embodiment of the present invention.

In FIGS. 8 and 9, an initial angle between light indicated as a dashed arrow and light indicated as a solid arrow is the same. However, distances d1 and d2 between the first and second positions on the sensing unit 30 are different. In more detail, the distance d2 between the first and second positions on the sensing unit 30 in FIG. 9 is greater than the distance d1 between the first and second positions on the sensing unit 30 in FIG. 8. This means that a less expensive sensing unit having a lower level of accuracy may be used in FIG. 9 in comparison to the case illustrated in FIG. 8, or means that, when a sensing unit having the same level of accuracy is used in FIGS. 8 and 9, a minute thickness change of a target object may be more accurately measured in FIG. 9 in comparison to the case illustrated in FIG. 8.

In order to achieve the above advantage of FIG. 9, as illustrated in FIG. 9, the apparatus according to the current embodiment may further include an amplifier tube 60 for passing the beam reflected on the curved reflector 20 before being incident onto the sensing unit 30, and having at least two facing reflective surfaces 61 and 63. The at least two facing reflective surfaces 61 and 63 of the amplifier tube 60 may be parallel to each other. Here, various modifications may be allowed. For example, the distance d2 between the first and second positions on the sensing unit 30 may be further increased by disposing the at least two facing reflective surfaces 61 and 63 of the amplifier tube 60 to be nonparallel to each other.

Alternatively, as illustrated in FIG. 10, the distance d2 between the first and second positions on the sensing unit 30 may be increased without using the amplifier tube 60 by forming a long optical path of the beam after being reflected on the curved reflector until being incident onto the sensing unit 30. However, when FIGS. 9 and 10 are compared, the size (S11×S12) of the apparatus using the amplifier tube 60 in FIG. 9 is less than the size (S21×S22) of the apparatus not using an amplifier tube in FIG. 10. As such, the size of the apparatus may be greatly reduced by using the amplifier tube 60.

Figure 11:
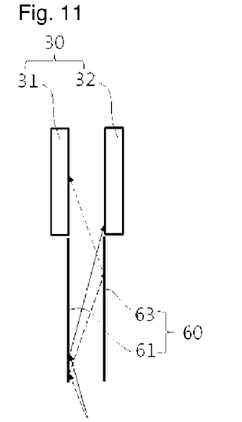
FIG. 11 is a conceptual view of a portion of an apparatus for measuring a thickness change, according to another embodiment of the present invention.
Figure 12:
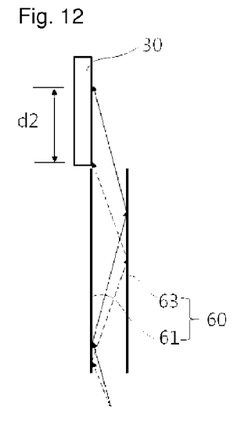
FIG. 12 is a conceptual view of a portion of an apparatus for measuring a thickness change, according to another embodiment of the present invention.

If the amplifier tube 60 is used, as illustrated in FIG. 11 that is a conceptual view of a portion of an apparatus for measuring a thickness change, according to another embodiment of the present invention, the sensing unit 30 may include a first sensing unit 31 disposed at an end of any one of the at least two facing reflective surfaces 61 and 63 of the amplifier tube 60 (e.g., the reflective surface 61), and a second sensing unit 32 disposed at an end of the other of the at least two facing reflective surfaces 61 and 63 of the amplifier tube 60 (e.g., the reflective surface 63). Alternatively, as illustrated in FIG. 12 that is a conceptual view of a portion of an apparatus for measuring a thickness change, according to another embodiment of the present invention, the sensing unit 30 may be disposed at an end of any one of the at least two facing reflective surfaces 61 and 63 of the amplifier tube 60 (e.g., the reflective surface 61).

Although the light source 10 irradiates the beam 11 onto the target object 42 at a uniform incident angle in the above descriptions, the present invention is not limited thereto and, if necessary, a light source actuator (not shown) for adjusting an incident angle of the beam 11 irradiated from the light source 10 onto the target object 42 may be further included. Also, if necessary, a stage actuator (not shown) for changing the position of the stage 40 for mounting the target object 42 with respect to the curved reflector 20 may be further included to adjust the incident position of the beam 13 reflected on the target object 42, on the curved reflector 20.

Figure 13:
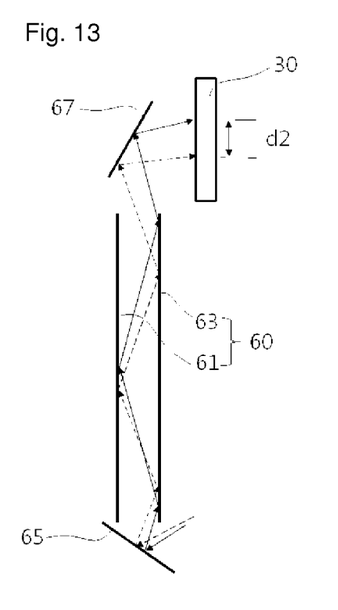
FIG. 13 is a conceptual view of a portion of an apparatus for measuring a thickness change, according to another embodiment of the present invention.

Meanwhile, as illustrated in FIG. 13 that is a conceptual view of a portion of an apparatus for measuring a thickness change, according to another embodiment of the present invention, an incident angle adjusting unit 65 and an exit angle adjusting unit 67 may be further included. The incident angle adjusting unit 65 may adjust an incident angle of the beam reflected on the curved reflector 20, into the amplifier tube 60. The exit angle adjusting unit 67 may adjust an incident angle of the beam passed through the amplifier tube 60, onto the sensing unit 30. If the target object 42 has a very small thickness change, an angle between the beam 15 and the beam 19 reflected on the curved reflector 20 may be very small. In this case, the distance d2 between the first and second positions on the sensing unit 30 may be increased by using the amplifier tube 60. Furthermore, if the incident angle adjusting unit 65 adjusts the incident angle of the beam reflected on the curved reflector 20, into the amplifier tube 60, even when the amplifier tube 60 having the same length is used, the distance d2 between the first and second positions on the sensing unit 30 may be ultimately greatly increased. The exit angle adjusting unit 67 may also ultimately greatly increase the distance d2 between the first and second positions on the sensing unit 30 by adjusting the incident angle of the beam passed through the amplifier tube 60, onto the sensing unit 30.

However, the present invention is not limited thereto and various modifications may be allowed here. For example, at least one of the incident angle adjusting unit 65 and the exit angle adjusting unit 67 may be included. Also, the incident angle adjusting unit 65 and/or the exit angle adjusting unit 67 may also be used for a purpose other than the purpose of increasing the distance d2 between the first and second positions on the sensing unit 30. For example, the incident angle adjusting unit 65 may be used to change an optical path of the beam reflected on the curved reflector 20 in such a way that the beam is appropriately incident into the amplifier tube 60, and the exit angle adjusting unit 67 may be used to change an optical path of the beam passed through the amplifier tube 60 in such a way that the beam is appropriately incident onto the sensing unit 30.

A case when the thickness of the target object 42 is reduced as illustrated in FIGS. 1 and 2 is described above. The case may correspond to, for example, a case when a thin film is etched. However, the present invention is not limited thereto and may also be applied to a case when the thickness of the target object 42 is increased. In this case, the position of the reflected beam incident onto the sensing unit 30 after the thickness of the target object 42 is changed may be opposite to the reflected beam 19 with respect to the reflected beam 15 in FIG. 2.

A method or apparatus for measuring a thickness change may also be used to measure the thickness of a thin film. For example, if the first position is defined with respect to a surface for depositing the thin film before the thin film is deposited, as illustrated in FIG. 1, and then the second position is defined after the thin film is deposited, as illustrated in FIG. 2, the thickness of the deposited thin film may be ultimately measured.

Also, a method or apparatus for measuring a thickness change, according to an embodiment of the present invention, may be variously modified.

An example of a system using the apparatus may be a system for measuring a thickness uniformity of a thin film. That is, a thickness change of the target object 42 may be measured according to the difference between a first position sensed by the sensing unit 30 when beam reflected on one position of the target object 42 is reflected on the curved reflector 20 and is incident onto the sensing unit 30, and a second position sensed by the sensing unit 30 when beam reflected on another position of the target object 42 is reflected on the curved reflector 20 and is incident onto the sensing unit 30. Here, various modifications may be allowed. For example, in order to irradiate beam onto the other position of the target object 42 after irradiating beam onto the one position of the target object 42, a scanner (e.g., an xy scanner) for changing the position of the target object 42 on a plane may be further included. In this manner, a method of measuring a thickness uniformity of a thin film may also be achieved.

Another example of a system using the apparatus may be a morphology microscope. That is, if a scanner (e.g., an xy scanner) for changing the position of the target object 42 on a plane is used, a morphology image of the target object 42 may be defined by changing the position of the target object 42 on a plane to change an incident position of beam on the target object 42, and obtaining data regarding a change of an incident position of the beam incident onto the sensing unit 30. In this manner, a method of acquiring a morphology image may also be achieved.

While the present invention has been particularly shown and described with reference to exemplary embodiments thereof, it will be understood by one of ordinary skill in the art that various changes in form and details may be made therein without departing from the spirit and scope of the present invention as defined by the following claims.

INDUSTRIAL APPLICABILITY

An apparatus for measuring a thickness change, a system using the apparatus, a morphology microscope using the apparatus, a method of measuring a thickness change, and a method of acquiring a morphology image by using the measuring method, by which a minute thickness change may be precisely and accurately measured or a morphology image may be acquired by using an inexpensive and simple configuration, may be implemented.

The invention claimed is:

1. An apparatus for measuring a thickness change, the apparatus comprising:
   a light source for irradiating a beam onto a target object;
   a curved reflector for reflecting the beam reflected on the target object and incident onto the curved reflector;
   a sensing unit for sensing the beam reflected on the curved reflector; and
   a lens unit for passing the beam emitted from the light source before reaching the target object,
   wherein the lens unit changes a beam width of the beam emitted from the light source after being passed through the lens unit in such a way that the beam reflected on the target object converges on a center of a curved surface at an incident position of the beam on the curved reflector.

2. The apparatus of claim 1, wherein the light source irradiates the beam onto the target object at an angle of 45°.

3. The apparatus of claim 1, wherein the light source is a laser light source.

4. The apparatus of claim 1, wherein the light source comprises:
a light-emitting device; and
a pin hole for passing a portion of light emitted from the light-emitting device.

5. The apparatus of claim 1, wherein the curved reflector is at least a portion of a spherical reflective surface.

6. The apparatus of claim 1, wherein the apparatus measures a thickness change of the target object according to a difference between a first position sensed by the sensing unit when beam reflected on the target object before a thickness of the target object is changed is reflected on the curved reflector and is incident onto the sensing unit, and a second position sensed by the sensing unit when beam reflected on the target object after the thickness of the target object is changed is reflected on the curved reflector and is incident onto the sensing unit.

7. The apparatus of claim 1, wherein the apparatus measures a thickness change of the target object according to a difference between a first position sensed by the sensing unit when beam reflected on one position of the target object is reflected on the curved reflector and is incident onto the sensing unit, and a second position sensed by the sensing unit when beam reflected on another position of the target object is reflected on the curved reflector and is incident onto the sensing unit.

8. The apparatus of claim 1, further comprising a light source actuator for adjusting an incident angle of the beam irradiated from the light source onto the target object.

9. The apparatus of claim 1, further comprising:
a stage for mounting the target object; and
a stage actuator for changing a position of the stage with respect to the curved reflector.

10. The apparatus of claim 1, further comprising an amplifier tube for passing the beam reflected on the curved reflector before being incident onto the sensing unit, and having at least two facing reflective surfaces.

11. The apparatus of claim 10, wherein the at least two facing reflective surfaces of the amplifier tube are parallel to each other.

12. The apparatus of claim 10, wherein the sensing unit is disposed at an end of any one of the at least two facing reflective surfaces of the amplifier tube.

13. The apparatus of claim 10, wherein the sensing unit comprises:
a first sensing unit disposed at an end of any one of the at least two facing reflective surfaces of the amplifier tube; and
a second sensing unit disposed at an end of the other of the at least two facing reflective surfaces of the amplifier tube.

14. The apparatus of claim 10, further comprising at least one of:
an incident angle adjusting unit for adjusting an incident angle of the beam reflected on the curved reflector, into the amplifier tube; and
an exit angle adjusting unit for adjusting an incident angle of the beam passed through the amplifier tube, onto the sensing unit.

15. A method of measuring a thickness change, the method comprising:
(a) irradiating beam onto a target object before a thickness of the target object is changed;
(b) defining a first position of the beam reflected on the target object, reflected on a curved reflector, and incident onto a sensing unit;
(c) irradiating a beam onto the target object after the thickness of the target object is changed;
(d) defining a second position of the beam reflected on the target object, reflected on the curved reflector, and incident onto the sensing unit;
(e) determining the thickness change of the target object according to a difference between the first and second positions
wherein the steps (a) and (c) comprise irradiating the beam to be passed through a lens unit before reaching the target object, and
wherein the lens unit changes a beam width of the beam after being passed through the lens unit in such a way that the beam reflected on the target object converges on a center of a curved surface at an incident position of the beam on the curved reflector.

16. The method of claim 15, wherein the curved reflector is at least a portion of a spherical reflective surface.

17. The method of claim 15, wherein the steps (b) and (d) comprise passing the beam reflected on the curved reflector through an amplifier tube having at least two facing reflective surfaces before being incident onto the sensing unit.

18. A method of measuring a thickness change, the method comprising:
(a) irradiating beam onto one position of a target object;
(b) defining a first position of the beam reflected on the target object, reflected on a curved reflector, and incident onto a sensing unit;
(c) irradiating a beam onto another position of the target object;
(d) defining a second position of the beam reflected on the target object, reflected on the curved reflector, and incident onto the sensing unit;
(e) determining the thickness change of the target object according to a difference between the first and second positions,
wherein the steps (a) and (c) comprise irradiating the beam to be passed through a lens unit before reaching the target object, and wherein the lens unit changes a beam width of the beam after being passed through the lens unit in such a way that the beam reflected on the target object converges on a center of a curved surface at an incident position of the beam on the curved reflector.

19. The method of claim 18, wherein the steps (a) and (c) comprise irradiating the beam onto the target object at an angle of 45°.

20. The method of claim 18, wherein the steps (b) and (d) comprise passing the beam reflected on the curved reflector through an amplifier tube having at least two facing reflective surfaces before being incident onto the sensing unit.

21. An apparatus for measuring a thickness change, the apparatus comprising:
a light source for irradiating a beam onto a target object;
a curved reflector for reflecting the beam reflected on the target object and incident onto the curved reflector;
a sensing unit for sensing the beam reflected on the curved reflector; and
an amplifier tube for passing the beam reflected on the curved reflector before being incident onto the sensing unit, and having at least two facing reflective surfaces.

22. The apparatus of claim 21, further comprising a lens unit for passing the beam emitted from the light source before reaching the target object, wherein the lens unit gradually reduces a beam width of the beam emitted from the light source after being passed through the lens unit and until being incident onto the curved reflector.

23. The apparatus of claim 21, further comprising a lens unit for passing the beam emitted from the light source before reaching the target object, wherein the lens unit changes a beam width of the beam emitted from the light source after being passed through the lens unit in such a way that the beam has a uniform beam width after being reflected on the curved reflector and until being incident onto the sensing unit.

24. A method of measuring a thickness change, the method comprising:
(a) irradiating beam onto a target object before a thickness of the target object is changed;
(b) defining a first position of the beam reflected on the target object, reflected on a curved reflector, and incident onto a sensing unit;
(c) irradiating a beam onto the target object after the thickness of the target object is changed;
(d) defining a second position of the beam reflected on the target object, reflected on the curved reflector, and incident onto the sensing unit; and
(e) determining the thickness change of the target object according to a difference between the first and second positions.

wherein the steps (b) and (d) comprise passing the beam reflected on the curved reflector through an amplifier tube having at least two facing reflective surfaces before being incident onto the sensing unit.

25. A method of measuring a thickness change, the method comprising:
(a) irradiating beam onto one position of a target object;
(b) defining a first position of the beam reflected on the target object, reflected on a curved reflector, and incident onto a sensing unit;
(c) irradiating a beam onto another position of the target object;
(d) defining a second position of the beam reflected on the target object, reflected on the curved reflector, and incident onto the sensing unit; and
(e) determining the thickness change of the target object according to a difference between the first and second positions, wherein the steps (b) and (d) comprise passing the beam reflected on the curved reflector through an amplifier tube having at least two facing reflective surfaces before being incident onto the sensing unit.

* * * * *